US 8,996,513 B2

(12) United States Patent
El Daher

(10) Patent No.: US 8,996,513 B2
(45) Date of Patent: Mar. 31, 2015

(54) PROVIDING AN INTERFACE TO ACCESS WEBSITE ACTIONS

(75) Inventor: Antoine El Daher, Kenmore, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/556,659

(22) Filed: Jul. 24, 2012

(65) Prior Publication Data
US 2014/0032524 A1 Jan. 30, 2014

(51) Int. Cl.
*G06F 7/00* (2006.01)
*G06F 17/30* (2006.01)

(52) U.S. Cl.
CPC .... *G06F 17/30864* (2013.01); *G06F 17/30905* (2013.01)
USPC ........................................................ 707/726

(58) Field of Classification Search
CPC .................... G06F 17/30864; G06F 17/30867; G06F 17/30; G06F 21/6227; G06F 2221/2119
USPC .................................................. 707/709, 726
See application file for complete search history.

(56) References Cited

U.S. PATENT DOCUMENTS

| | | | |
|---|---|---|---|
| 2008/0313574 A1 | 12/2008 | Aravamudan et al. | |
| 2011/0131241 A1 | 6/2011 | Petrou et al. | |
| 2011/0264673 A1 | 10/2011 | White et al. | |
| 2011/0295847 A1* | 12/2011 | Cucerzan et al. | 707/723 |
| 2012/0233205 A1* | 9/2012 | McDermott | 707/769 |

OTHER PUBLICATIONS

White, et al., "Predicting Short-Term Interests Using Activity-Based Search Context", In Proceedings of the 19th ACM International Conference on Information and Knowledge Management, Oct. 26, 2010, pp. 1009-1018.
Dunn, et al., "Asset Actions: Deep Sharing of Repository Content via Actionable URLs", Retrieved on: Apr. 10, 2012, Available at: https://wiki.dlib.indiana.edu/download/attachments/1900645/Springforum.pdf?version=1&modificationDate=1208540558000.
Guess, Angela, "Bing Further Leverages the Semantic Web with Action Buttons", Published on: Sep. 26, 2011, Available at: http://semanticweb.com/bing-further-leverages-the-semantic-web-with-action-buttons_b23447.
Foulonneau, et al., "The "Asset Actions" Experiment & Portal as Demonstrated at the DLF Forum, Spring 2006", Apr. 27, 2006, Available at: http://www.ideals.illinois.edu/bitstream/handle/2142/76/AssetActionsExperiment.rtf.pdf?sequence=3.

* cited by examiner

*Primary Examiner* — Truong Vo
(74) *Attorney, Agent, or Firm* — Dave Ream; Aaron Hoff; Micky Minhas

(57) ABSTRACT

Providing an interface to request actions of a website includes various elements. For example, website instructions of the website are provided to a search engine, the website instructions describing the website tool. The website instructions may be indexed by the search engine to be referenced when servicing a search query. When the website is deemed relevant to the search query, a search-result snippet may be built to include the interface to the website tool. As such, the interface may be provided in the search-results webpage. The interface may be used in the search-results webpage or may be stored locally. The interface may be used to access the website tool without a browser navigating to a landing page of the website.

19 Claims, 7 Drawing Sheets

PROVIDING AN INTERFACE TO ACCESS WEBSITE ACTIONS

BACKGROUND

Often a website provides a tool that performs an action, such as document conversion, weather lookup, and the like. Typically a user navigates to the website in order to access the tool and request the action be performed. For example, when a browser receives and displays the website together with the tool, an input can be provided to the browser and communicated to the website server. The website server can then execute the tool to perform the action and communicate an output back to the browser.

SUMMARY

In brief and at a high level, this disclosure describes, among other things, providing an interface for access to a website tool, which performs an action. For example, the interface may be provided by a search engine in a search-engine response page. In addition, the interface may be copied from the search-engine response page and stored into anther medium (e.g., computing-device home screen, email, word-processing document, spreadsheet document, etc.). The interface may be used to access the website tool without a browser navigating to the website.

This summary provides an overview of the disclosure and introduces a selection of concepts that are further described below in the detailed-description section. This summary is not intended to identify key features or essential features of the claimed subject matter, nor is it intended to be used as an aid in isolation to determine the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated herein by reference, wherein.

DETAILED DESCRIPTION

Figure 1:
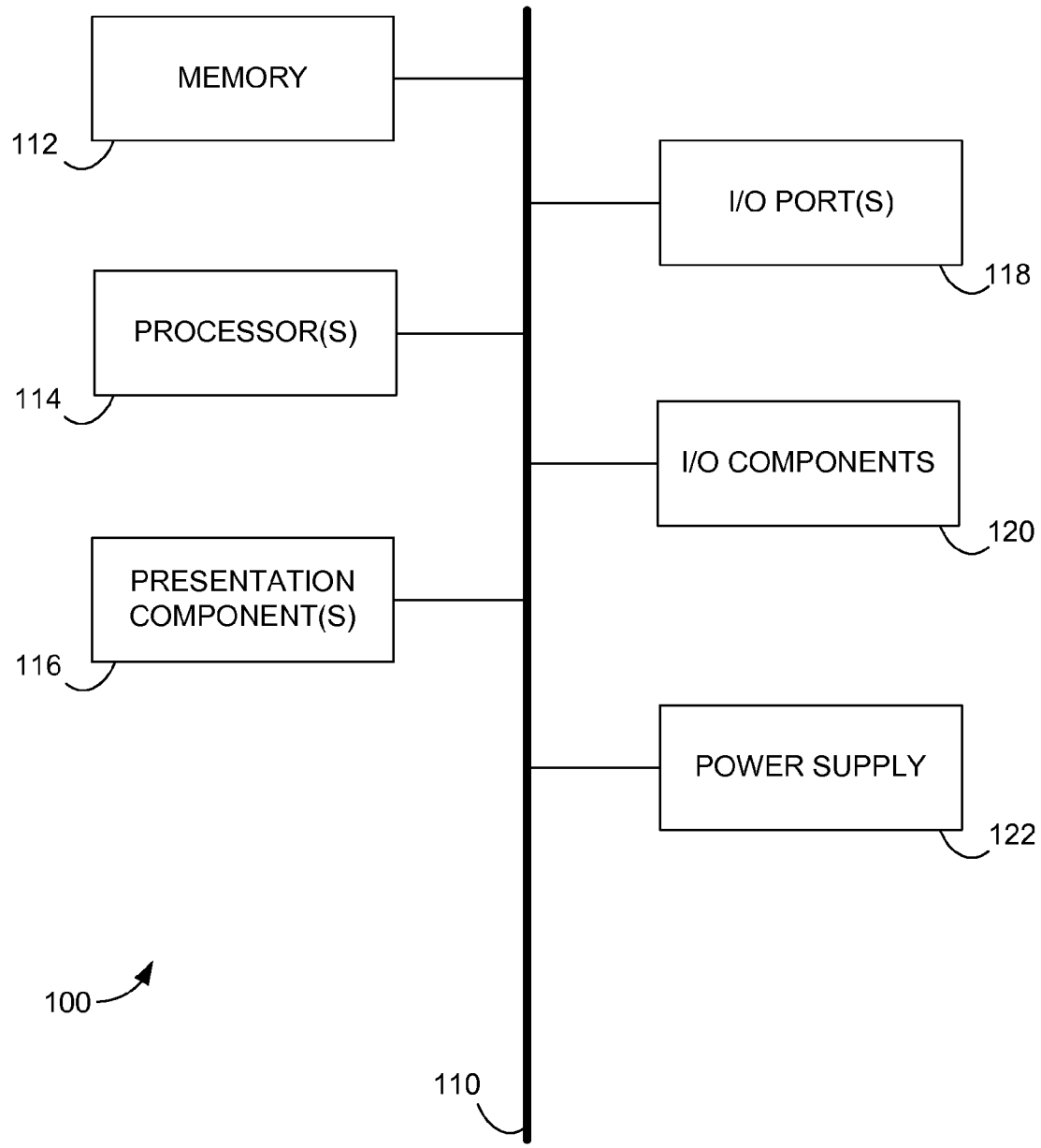
FIG. 1 depicts an exemplary computing device in accordance with an embodiment of the present invention.

The subject matter of select embodiments of the present invention is described with specificity herein to meet statutory requirements. But the description itself is not intended to define what is regarded as an invention; rather the claims define the invention. The claimed subject matter might be embodied in other ways to include different elements or combinations of elements similar to the ones described in this document, in conjunction with other present or future technologies. Terms should not be interpreted as implying any particular order among or between various steps or elements herein disclosed unless and except when the order of individual steps is explicitly stated.

An embodiment of the present invention is directed to providing an interface to a website. The interface provides access to a website tool provided by the website. For example, the interface may be provided in a search-engine response page. In addition, the interface may be copied from the search-engine response page and stored into anther medium (e.g., computing-device home screen, email, word-processing document, spreadsheet document, etc.).

In this description, an "interface" is an object (e.g., web object) that allows a computing device to request an action provided by a tool of a website without requiring a browser running on the computing device to load the website's webpage. In this description, an "action" is a functionality (e.g., service) provided by a tool. Examples of actions include converting a document from one format to another, looking up weather, performing a calculation, converting units from one format to another, and the like. In this description, a "tool" is a set of instructions that are executed by a computing device in order to perform an action. For example, the tool might include computer-executable instructions stored on a website server, which executes the tool when requested in order to perform an action. In an embodiment of the present invention, an output is generated from an input as a result of a tool being used to perform an action.

As indicated, in an embodiment the interface may be constructed into a search-engine response page (SERP). A SERP is a webpage that is generated by a search engine in response to a search query. Often a SERP includes a listing of search results that are deemed relevant to a search query, and each search result may include a search-result snippet.

In this description, a "search-result snippet" generally describes a set of information that is associated with an individual search result (e.g., web document) and that is listed on a SERP to represent the individual search result. A search-result snippet may include various elements. For example, a search-result snippet may include a search-result title, which is often a title of the web document and is formatted as a hyperlink to the web document. That is, when the search-result title is input, a browser may navigate to a landing page identified by the search-result snippet. A search-result snippet may also include a search-result description including a description of information that may be included in the web document.

A search-result snippet may also include other features that add to the functionality of the snippet. For example, a search-result snippet may include specific hyperlinks (e.g., deep links) that are provided in addition to the hyperlinked search-result title and that allow a browser to navigate to a specific webpage of a website (e.g., reservations, flight check-in, etc.). In addition, a search-result snippet may include an expandable portion, which can be selected to present additional information in the SERP that is related to the specific search result and that may not be included in the search-result description. In an embodiment of the present invention, a search engine constructs a search-result snippet to include an interface, which allows a computing device access a tool of a website without requiring navigation to the landing page. That is, the tool may be accessed from the SERP.

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated. Computing device 100 may include a variety of different computing devices, such as a desktop, laptop, tablet, netbook, notebook, server, smartphone, and the like.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other storage medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. Exemplary input components include a microphone, keyboard, touch screen, mouse, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
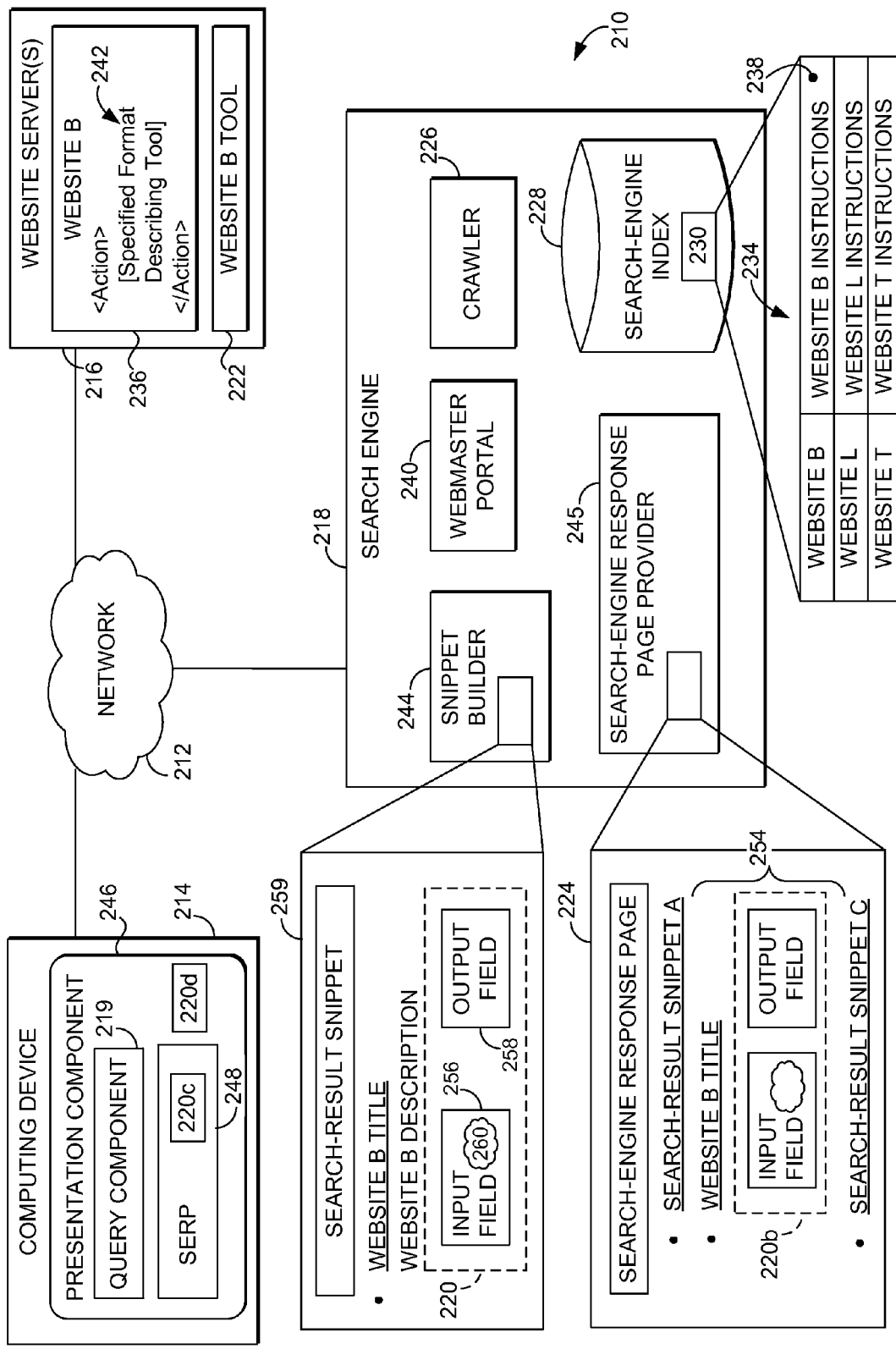
FIG. 2 depicts an exemplary schematic diagram of networked computing devices in accordance with an embodiment of the present invention.

Referring to FIG. 2, an exemplary computing environment 210 is depicted in which a computing device 214, one or more website servers 216, and a search engine 218 communicate by way of a network 212 (e.g., leveraging the Internet). In FIG. 2, client computing device 214 includes a query component 219, which enables computing device 214 to submit a search query to search engine 218. Snippet builder 244 of search engine 218 constructs a search-result snippet 259 when responding to the search query. In an embodiment of the present invention, search-result snippet is constructed to include an interface 220, which provides access to a website tool 222. Interface 220 may provided by search engine 218 as an element of a search-engine response page 224. Once received by computing device 214, interface 220 may be stored in other locations by computing device 214, such as on a computing-device home screen, in a document (e.g., word processing document), in an email, and the like.

Website servers 216 include a website "B" 236 and website B tool 222. As such, when a browser executed by a client computing device (e.g., device 214) requests website-rendering information (e.g., HTML, CSS, etc.), the website server 216 transmits the website-rendering information to the client computing device. Website "B" 236 includes website tool 222, which may be accessed by navigating to one or more webpages of website 236. Examples of a website tool include a document-format-conversion tool, a weather-lookup tool, a calculator, a units-conversion tool, and the like. As such, the website tool 222 may be stored on and executed by the website servers 216. That is, website tool 222 may include computer-executable instructions that, when executed by a computing device (e.g., website server 216), perform a desired action.

In an embodiment of the present invention, website B tool 222 is not necessarily stored on a client computing device, such as 214. Rather, website B tool 222 is stored on a website server 216, and an action performed by website B tool 222 may be requested using a browser being executed by the client computing device. As such website B tool 222 and website servers 216 receive action requests and inputs from the browser that are sent over network 212. In response to the action request and inputs, website servers 216 may execute computer instructions specified by website B tool 222 to generate an output, and servers 216 may leverage network 212 to provide the output to be displayed in the browser.

Search engine 218 may include one or more computing devices that function together to provide search results in response to a search query. As such, search engine 218 includes a search-engine index 228, which can be referenced when a search query is received. For example, search-engine index 228 includes data 230, which is depicted in an enlarged view to include a table of information 234 that can be referenced when determining whether a website is relevant to a search query.

FIG. 2 depicts that the table of information 234 in the search-engine index 228 includes information describing website "B" 236. For example, information describing website "B" might include information that is analyzed by search engine 218 to determine whether website "B" 236 is relevant to a search query. In an embodiment of the present invention website B instructions 238 include information that describes website tool 222.

Search engine 218 might obtain website B instructions 238 in various ways. For example, search engine 218 includes a crawler 226 that analyzes websites and webpages to collect website information, which is stored in search-engine index 228. In an embodiment of the present invention, website "B" 236 may be written (e.g., XML, HTML, etc.) to include information describing website B tool 222. As such, when crawler 226 analyzes website "B" 236, crawler 226 will collect the information describing website B tool 222.

In an embodiment of the present invention, a website-tool format may be specified (e.g., such as by search engine 218) describing a manner in which information describing website B tool 222 is to be organized. The specified format may enable crawler 226 to recognize the information as being relevant to a website tool, as opposed to other types of information that may be analyzed by crawler 226 (e.g., keywords). As such, when the information describing tool 222 is organized in the specified format 242 (e.g., by a webmaster, web designer, and the like), crawler 226 determines that website "B" 236 includes tool 222, which performs an action. Information describing tool 222 and the action may then be appropriately indexed in search-engine index 228, such as under website B instructions 238.

Search engine 218 may obtain website B instructions 238 in other ways, as well. In another embodiment of the present invention, search engine 218 includes a webmaster portal 240, through which a webmaster, website designer, or the like submits information describing website B. As such, through webmaster portal 240, information may be submitted to search engine 218 describing website B tool 222. The webmaster portal 240 may specify a website-tool format (e.g., similar to format 242) in which information is to be submitted to allow search engine 218 to determine that website "B" 236 includes tool 222 and to allow the information to be accurately categorized in search-engine index 228.

An example of a website-tool format in which information describing tool 222 and its corresponding action is to be organized includes the below format.

```
<Actions>
    <Action Name = "Name">
        <Parameter Name = "Parameter 1" Type = Parameter Type>
        <Parameter Name = "Parameter 2 " Type = Parameter Type>
        <Target = "http://www.actionwebsite.com/action.aspx?q=
    {Parameter 1}&loc={Parameter 2}" Type = "GET">
    </Action>
</Actions>
```

That is, when information is organized in this exemplary format, search engine 218 determines that website "B" 236 includes website B tool 222 performing an action. In addition, website B instructions 238 are indexed that describe website B tool 222.

In one embodiment of the present invention, format 242 of website "B" 236 includes information describing a mechanism with which an input is supplied to website B tool 222, which uses the input to create an output. For example, format 242 may provide instructions as to how an input is transmitted to website server 216, which in turn executes tool 222 to provide an output. In one embodiment, format 242 includes a service-call instruction that, when executed by a browser, transmits an input and an action request to website server 216. In response, website server 216 may execute tool 222 and provide an output back to the computing device running the browser. In an embodiment of the present invention, the website B instructions 238 include the information describing the mechanism with which website B tool 222 is accessed (e.g., the service-call instructions).

Search engine 218 may complete various actions to validate information received from a website to verify that the website tool 222 works and that the mechanism effectively provides access to the website tool 222. For example, a test execution may be performed to verify that the mechanism does in fact provide access to the website tool. In addition, a check may be run to verify that all fields (e.g., elements, tags, and the like) of the specified format include data and that the provided data is in the proper form.

Search engine 218 also includes a snippet builder 244, which builds search-result snippets (e.g., 259) that summarize respective search results (e.g., web pages or other web documents). For example, when website "B" 216 is deemed relevant to a search query, snippet builder 244 may receive information (e.g., 238) stored in search-engine index 228 and use the information to build a summarization of website "B" 236.

In an embodiment of the present invention, snippet builder 244 receives website B instructions 238 that describe tool 222 and describe the mechanism with which website B tool 222 is accessed. In addition, snippet builder 244 builds a search-result snippet 259 that describes tool 222 and that provides the mechanism (e.g., service-call instructions) with which website B tool 222 is accessed. That is, snippet builder 244 packages the instructions in a format that provides the interface 220 to the website B tool. As such, snippet builder 244 builds a snippet including an interface 220 that allows a user to leverage an action provided by tool 222 of website "B" 236 without requiring a browser to actually load website "B" 236 or navigate to the website B landing page. In a further embodiment of the present invention, the snippet 259 is provided to a computing device 214 as part of a SERP in response to a search query.

According to an embodiment of the present invention, interface 220 includes an input field 256 and an output field 258. Input field 256 is an element built by snippet builder 244 based on website B instructions 238. In embodiment of the present invention, input field 256 includes computer instructions 260 that when executed cause a request to be transmitted to perform the action provided by website B tool 222. Computer instructions 260 are depicted in FIG. 2 for explanatory purposes; however, in an embodiment of the invention, computer instructions 260 are not actually displayed in the search-result snippet 254 or the interface 220. Computer instructions 260 may be embedded in a selectable link that, when input, executes an action request. For example, when snippet 259 is provided to computing device 214, a browser being executed by computing device 214 may execute computer instructions 260 and cause the action request to be transmitted when a user provides input to input field 256. Output field 258 is configured to present an output received from website server 216 as a result of executing website B tool 222.

Search engine 218 also includes search-engine response page (SERP) provider 245. SERP provider 245 compiles the search-result snippets generated by snippet builder into a SERP 224. For example, SERP 224 includes a snippet 254 that corresponds to search-result snippet 259 described with respect to snippet builder 244. As such, SERP 224 includes interface 220*b*, which is the same interface (or a copy of the interface) described with respect to search-result snippet 259. Accordingly, SERP provider 224 compiles and creates SERP 224, including interface 220*b*, that, when provided to a computing device, enables the computing device to access website B tool 222 from the SERP without having to navigate to the website B landing page.

In another embodiment of the present invention, interface 220/220*b* is constructed to be an object, which is selectable from the search-result snippet to be copied and stored to another medium. That is, it may be desirable to copy interface 220/220*b* and store interface 220 in a location different than SERP 224. For example, when SERP 224 is provide to a client computing device, it may be desirable to copy and store interface 220/220*b* locally on the client computing device. Exemplary local storage locations include on the computing-device homescreen or in a document (e.g., word-processing document, spreadsheet, slide presentation, email, and the like). As such, interface 220/220*b* is constructed by snippet builder 244 in a manner that allows interface 220/220*b* and its components (e.g., input field, output field, selectable link, etc.) to include such a copy-friendly nature. Thus interface 220/220*b* and its constituent elements may be collectively copied in response to various inputs, including a drag-and-drop input or any other copy/paste input.

Computing device 214 may include some or all of the components described with respect to computing device 100 in FIG. 1 and may include a variety of different types of computing devices, such as a desktop, laptop, tablet, netbook, notebook, smartphone, and the like. In addition, computing device 214 may be described in this description as a "client computing device," but such a classification is exemplary in the context of other subject matter described herein. As such, computing device 214 is not limited to only functioning in a client capacity.

Computing device 214 includes a presentation device 246, such as a monitor or screen, touch-sensitive screen, and the like. Presentation device 246 is providing query component 219, which might be presented in a browser window. For example, query component 219 might be provided on a search-engine homepage, in a browser toolbar, or in a shortcut on a computing-device homepage. Query component 219 might be utilized when an input (e.g., voice, text, etc.) is provided in a query box (e.g., typing, speech-to-text, etc.) that is sent to search engine 218 as a search request. Presentation device 246 also includes a search-engine response page (SERP) 248, which is received by computing device 214 from search engine 218 in response to the search query.

Search-engine response page 248 might include a listing of search results received by computing device 214 from search engine 218 in response to the search query. The listing of search results includes a set of search-result snippets, each of which summarizes and provides information and features associated with a respective webpage. For example, SERP 248 might include a copy of SERP 224 that was described with respect to SERP provider 245, such that SERP 248 includes a copy 220*c* of interface 220/220*b*.

In an embodiment of the invention, SERP 248 includes search-result snippet 254/259 (or a copy thereof) that is built by snippet builder 244 and that is received by computing device 214 in response to a search query. As previously indicated, search-result snippet 259 includes various elements, such as interface 220. To illustrate that SERP 248 may include a copy of interface 220/220*b*, SERP includes item 220*c*, which represents a copy of interface 220/220*b*.

In an embodiment of the present invention, each of the versions and/or copies of interface 220/220*b*/220*c* includes input field 256 and output field 258. Input field 256 is an element built by snippet builder 244 based on website B instructions 238. In embodiment of the present invention, input field 256 includes computer instructions 260 that, when executed, cause a request to be transmitted to perform the action provided by website B tool 222. Computer instructions 260 are depicted in FIG. 2 for explanatory purposes; however, in an embodiment of the invention, computer instructions 260 are not actually displayed in the search-result snippet 254 or the interface 220. Computer instructions 260 may be embedded in a selectable link that, when input, executes an action request. For example, a browser being executed by computing device 214 may execute computer instructions 260 and cause the action request to be transmitted when a user provides input to input field 256. Output field 258 is configured to present an output received from website server 216 as a result of executing website B tool 222.

In a further embodiment of the present invention, interface 220*c* may be copied and stored locally onto computing device 214 when interface 220*c* is provided in SERP 248. For example, a drag-and-drop operation may be executed to copy interface 220*c* from the snippet and to store interface 220*c* locally on a computing device, such as on a computing-device homescreen. In another example, a cursor action (e.g., right mouse click) may be executed to allow interface 220*c* to be copied and to be stored locally on a computing device. To illustrate such a copy and store functionality, item 220*d* is depicted on the presentation component and represents a copy of interface 220*c*. Copying and storing interface 220*c* includes storing instructions 260, which include instructions enabling the computing device 214 to transmit an action request (e.g., service call) to a website server 216 executing the website tool 222. A copy 220*d* of interface 220*c* may be stored in a variety of other mediums, such as in a document (e.g., word-processing document, spreadsheet document, slide-presentation document, etc.), an email, and the like. Because the copy 220*d* of interface 220*c* includes the instructions 260, the website tool is accessible from the variety of other mediums without requiring the website "B" 236 to be loaded or requiring navigation to a landing webpage of website "B" 236. In addition, the copy 220*d* of interface 220*c* may be shared with other computing devices, such as by attaching the interface to an email or by uploading the interface to a social-networking website.

Figure 3A:
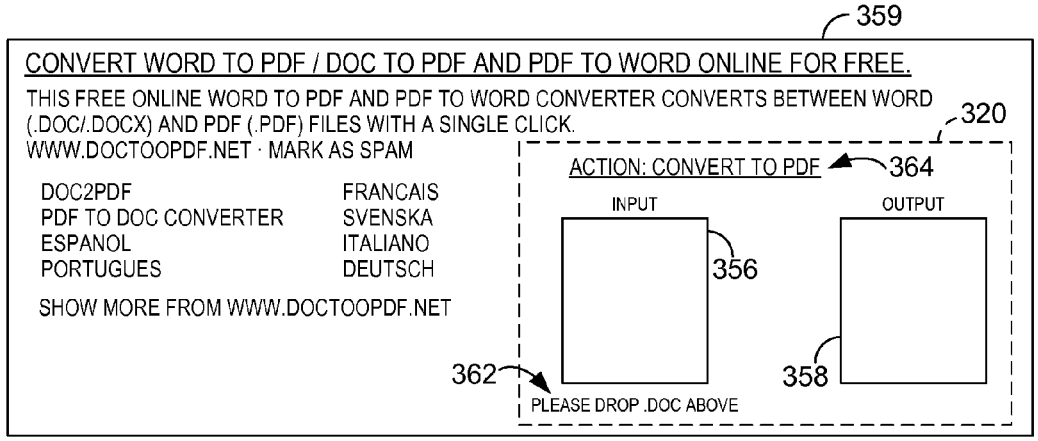
FIGS. 3A-3C depict versions of an exemplary search-result snippet in accordance with an embodiment of the present invention.
Figure 3B:
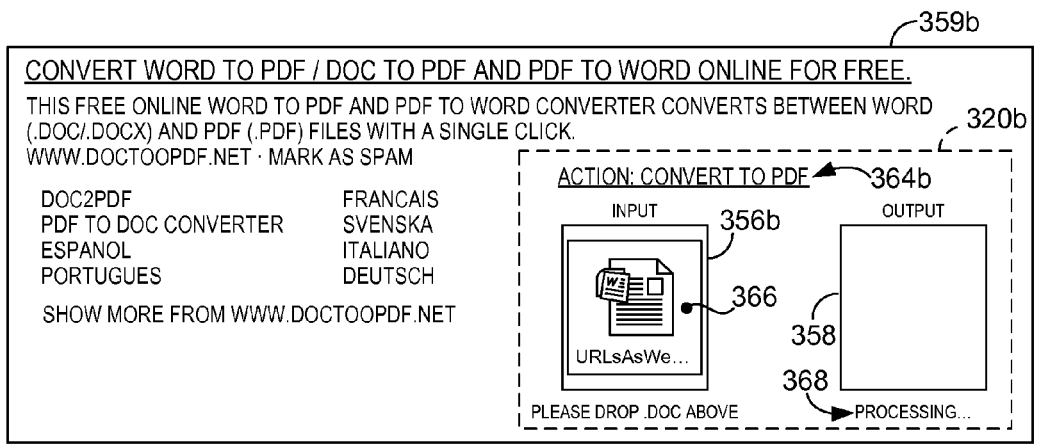
Figure 3C:
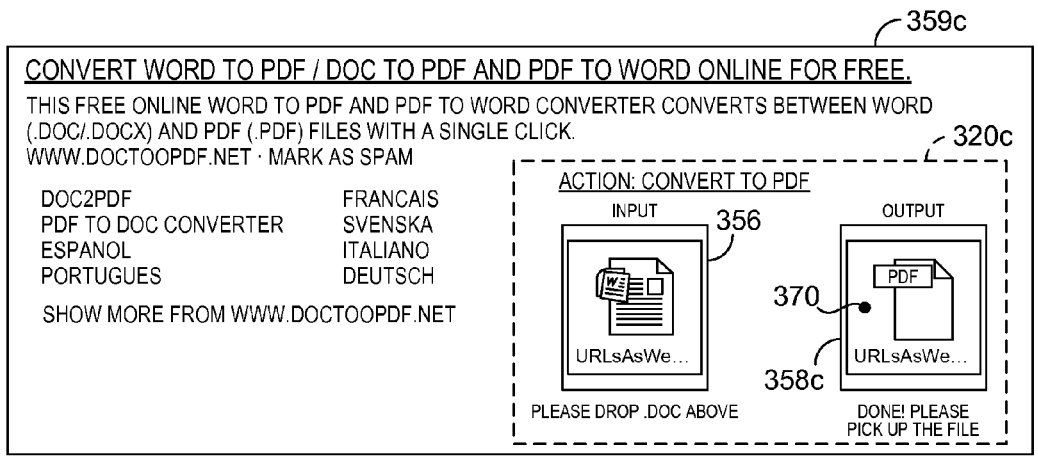

Referring now to FIGS. 3A-3C an illustrative interface 320 will be described in more detail to further describe a snippet that may be built by snippet builder 244. FIG. 3A illustrates an exemplary search-result snippet 359 of a website (i.e., "www-.doctoopdf.net") that provides a website tool, which converts a document from "word" to a "PDF" format. Search-result snippet 359 may be compiled with other snippets into a SERP when the website is deemed relevant to a search query. Interface 320 includes an input field 356 and an output field 358. In addition, interface 320 includes an instruction 362 (i.e., "Please drop .doc above") directing a user how to use the interface. Interface 320 also includes a selectable link 364.

In an embodiment of the present invention, input field 356, output field 358, instruction 362, selectable link 364, or a combination thereof are constructed based on website instructions associated with the website "www.doctoopdf-.net". For example, these interface elements (i.e., 356, 358, 362, and 364) may be constructed by the snippet builder based on instructions (e.g., 238) that were retrieved by a crawler and/or submitted through a web portal. As such, computer instructions stored with selectable link 364 cause an action request and input to be transmitted to the website tool of "www.doctoopdf.net". For illustrative purposes, FIG. 3A illustrates a single input field and a single output field. However, an interface constructed by snippet builder 244 may include multiple input fields and/or multiple output fields. For example, multiple input fields might include a location field and a date field, which are used to obtain a weather-forecast output.

Referring to FIG. 3B, a copy 359b of the snippet is illustrated to depict an interaction with interface 320b, when snippet 359b has been provided to a computing device in response to as search query. That is, FIG. 3A illustrates snippet 359 as constructed by a snippet builder, and FIG. 3B illustrates snippet 359b as it might appear when an interaction is taking place on a client computing device. In FIG. 3B, a "word" document 366 has been input into input field 356b. For example, word document 366 may have been dropped into input field 356b by a drag-and-drop input. In addition, a file-browse function may have been executed to allow a user to locate the word document to be selected as input in the input field 356b. Once word document 366 is provided in input field 356b, selectable link 364b may be selected, such as by a cursor or a touch input. Selection of link 364b causes the browser to execute instructions associated with link 364b and transmit an action request, together with word document 366, to the website tool of "www.doctoopdf.net". For example, the word document 366 (or a copy thereof) and the action request may be sent to website servers that host "www.doctoopdf.net". A status indication 368 is provided in interface 320b to indicate that the action (e.g., document conversion) is in progress.

Referring to FIG. 3C, a copy 359c of the snippet 359 is illustrated to depict an interaction with interface 320c, when snippet 359c has been provided to a computing device in response to as search query. That is, FIG. 3A illustrates snippet 359 as constructed by a snippet builder, and FIG. 3C illustrates snippet 359c as it might appear when an interaction is taking place on a client computing device. In FIG. 3C, a PDF document 370 has been received and is displayed in output field 358c. For example, PDF document 370 may have been received by the browser from the website server, which executed the website tool. PDF document 370 may then be opened or dragged onto the computing device. As such, FIGS. 3A-3C illustrate that interface 320, 320b, and 320c provides access to a website tool (i.e., doc converter) of a website without requiring a browser to load the website. Instead, the website tool is accessible directly from the search-result listing.

In an embodiment of the present invention, interface 320 may be copied and stored locally onto a client computing device (e.g., 214). For example, a drag-and-drop operation may be executed to copy interface 320 from the snippet (e.g., in FIG. 3A) and to store interface 320 locally on a computing device. In another example, a cursor action (e.g., right mouse click) may be executed to allow interface 320 to be copied and to be stored locally on a computing device. Copying and storing interface 320 includes storing selectable link 364, which includes instructions enabling the computing device to transmit an action request (e.g., service call) to a website server executing the website tool. As such, interface 320 may be stored in a variety of different mediums, such as a computing-device home screen, a document (e.g., word-processing document, spreadsheet document, slide-presentation document, etc.), an email, and the like. Because the stored version of interface 320 also includes the instructions associated with link 364, the website tool is accessible from the variety of other mediums without requiring the website to be loaded. The locally stored version of interface 320 may then be accessed at a different instant in time in order to request actions of the website tool. In addition, the locally stored version of the interface 320 may be shared with other computing devices, such as by attaching the interface to an email or by uploading the interface to a social-networking website.

Figure 4:
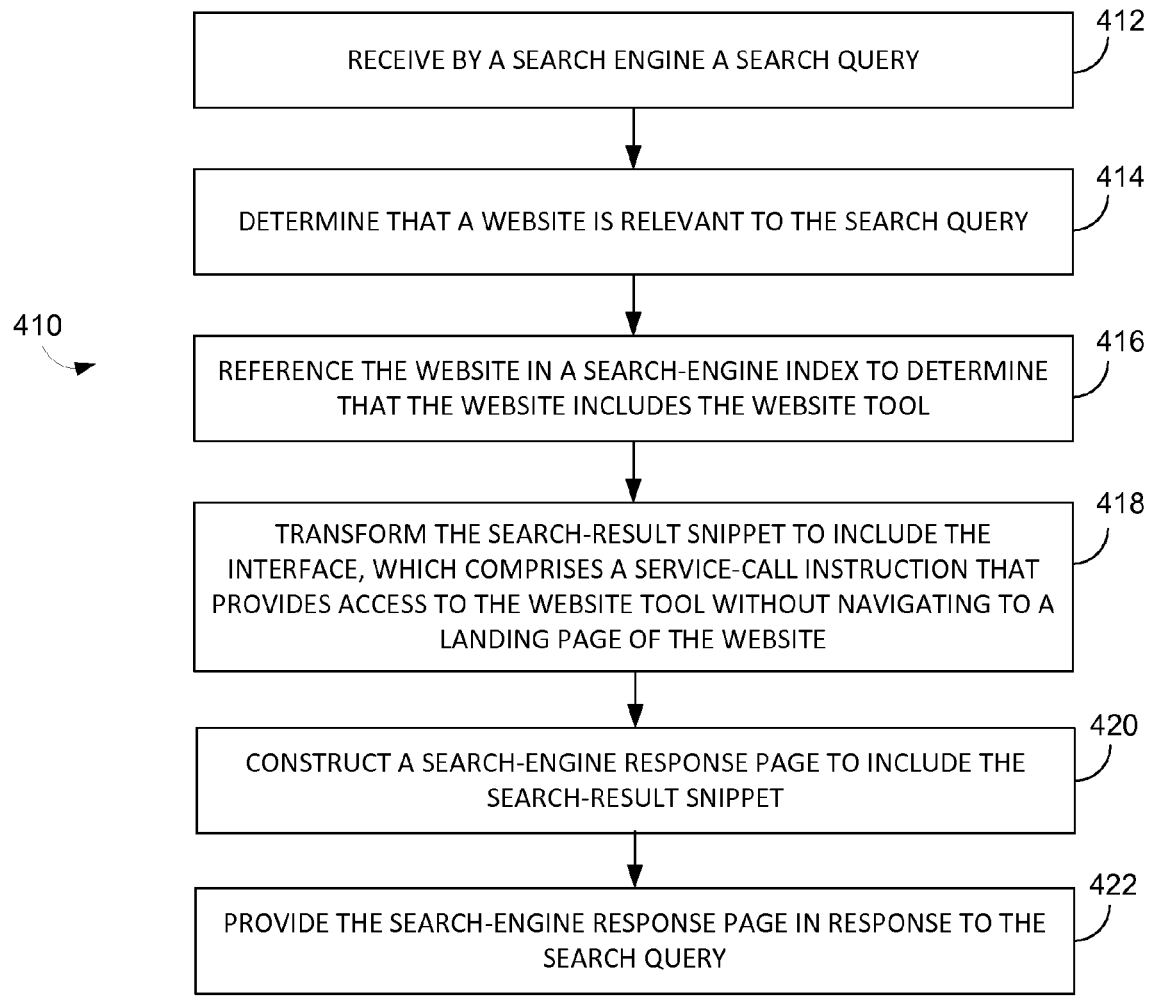
FIGS. 4-7 depict flow diagrams of exemplary methods in accordance with an embodiment of the present invention.

Referring now to FIG. 4, a flow diagram depicts a method 410 that may be carried out in accordance with an embodiment of the present invention. Steps of method 410 may be stored on computer-readable media as computer-executable instructions that, when executed by a computing device having a processor, perform a method of providing an interface that provides access to a website tool of a website. In describing method 410, reference may also be made to FIGS. 2 and 3A-3C.

Method 410 includes at step 412 receiving by a search engine a search query. For example, search engine 218 may receive a search query that is input into query component 219. Step 414 includes determining that the website is relevant to the search query. For example, by analyzing information in search-engine index 228, search engine 218 may determine that website 236 is relevant to the search query. At step 416, the website is referenced in a search-engine index to determine that the website includes the website tool. For example, search-engine index 228 may include a database that can be referenced and search engine 218 may analyze website B instructions 238 to determine that website "B" 222 includes website B tool 222.

Step 418 includes transforming the search-result snippet to include the interface, which comprises a service-call instruction that provides access to the website tool without navigating to a landing page of the website. For example, snippet builder 244 constructs search-result snippet 259 to include interface 220, which is programmed to include service-call instruction 260. Via interface 220 and service-call instruction 260, access is provided to website "B" tool 222 without having to navigate to a landing page of website "B" 236.

At step 420, a SERP is constructed to include the search-result snippet, and step 422 includes providing the SERP in response to the search query. For example, SERP 224 may be constructed to include snippet 254/259, and a copy 248 of SERP 224 is provided to computing device 214 in response to a search query. Thus, SERP 224 includes a copy 220c of interface 220/220b, which includes service-call instructions 260 that, when executed by computing device 214, causes an action request to be sent to website server 216.

Figure 5:
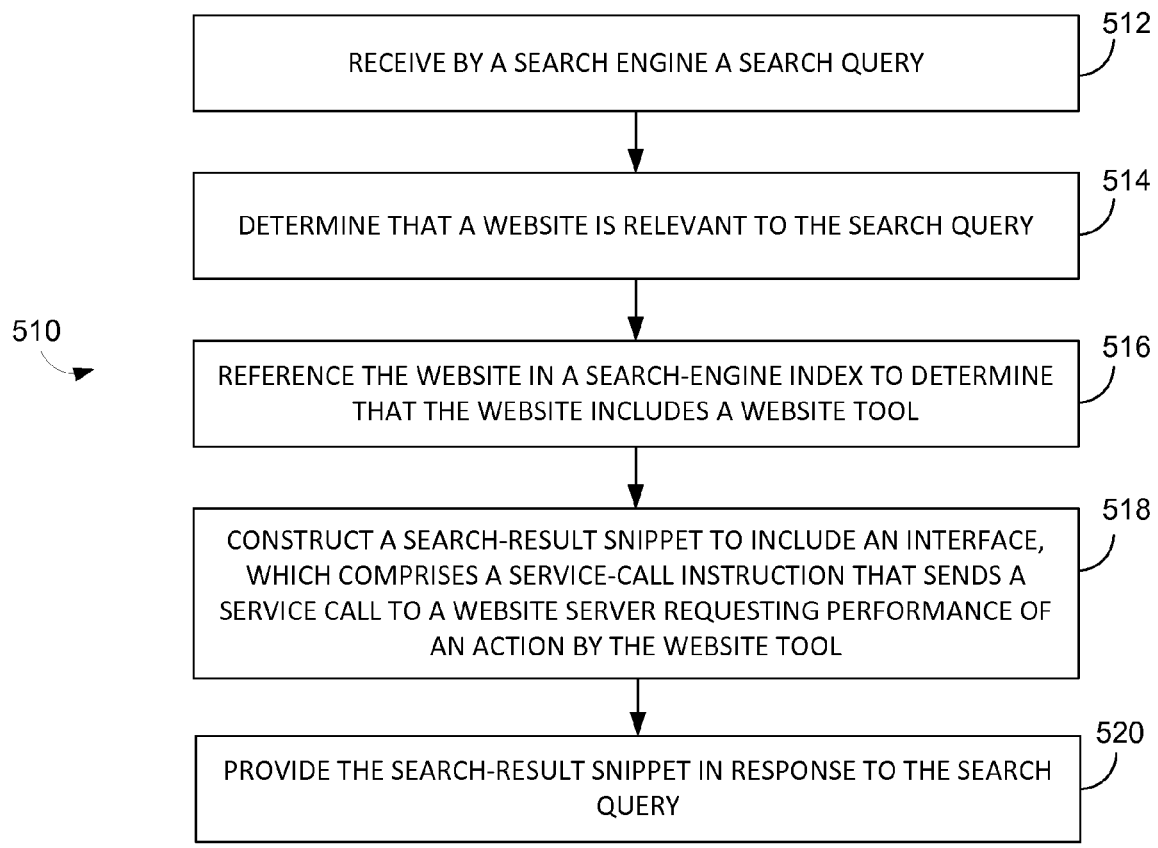

Referring now to FIG. 5, a flow diagram depicts a method 510 that may be carried out in accordance with an embodiment of the present invention. Steps of method 510 may be stored on computer-readable media as computer-executable instructions that, when executed by a computing device, perform a method of providing an interface that provides access to a website tool of a website. In describing method 510, reference may also be made to FIGS. 2 and 3A-3C.

Method 510 includes at step 512 receiving by a search engine a search query. For example, search engine 218 may receive a search query that is input into query component 219. Step 514 includes determining that the website is relevant to the search query. For example, by analyzing information in search-engine index 228, search engine 218 may determine that website 236 is relevant to the search query. At step 516, the website is referenced in a search-engine index to determine that the website includes the website tool. For example, search engine 218 may analyze website B instructions 238 to determine that website "B" 222 includes website B tool 222.

Step 518 includes constructing the search-result snippet to include the interface, which comprises a service-call instruction that, when executed, sends a service call to a website server requesting performance of an action by the website tool. At step 520, the search-result snippet that includes the interface is provided in response to the search query. For example, snippet builder may construct snippet 254/259, which is provided in SERP 224 to computing device 214 in response to a search query. Snippet 254/259 includes interface 220/220b, which includes service-call instructions 260 that, when executed by computing device 214, causes an action request to be sent to website server 216.

Figure 6:
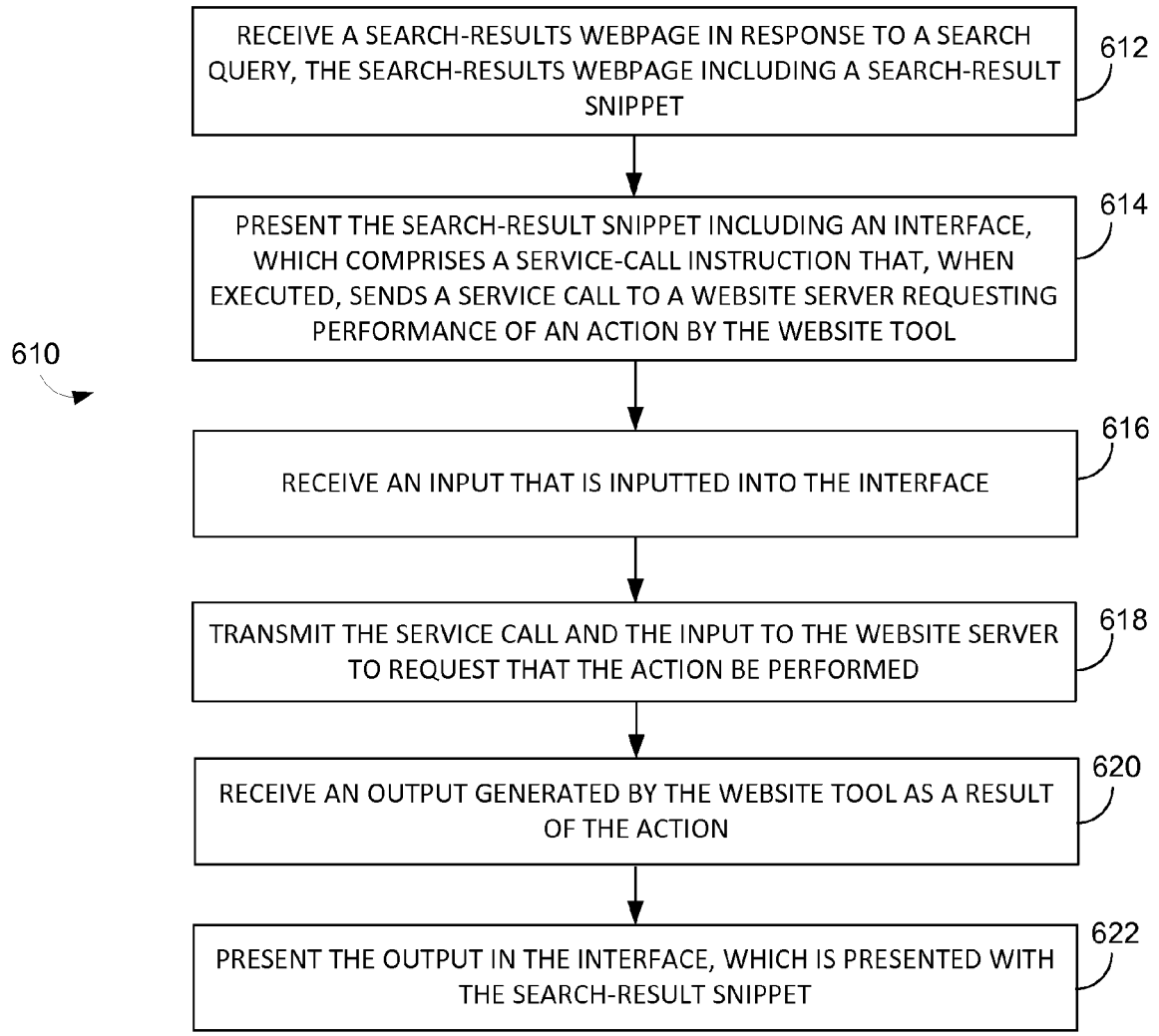

Referring now to FIG. 6, a flow diagram depicts a method 610 that may be carried out in accordance with an embodiment of the present invention. Steps of method 610 may be stored on computer-readable media as computer-executable instructions that, when executed by a computing device, perform a method of providing an interface that provides access to a website tool of a website. In describing method 610, reference may also be made to FIGS. 2 and 3A-3C.

Method 610 includes step 612 including receiving a search-results webpage in response to a search query, the search-results webpage including the search-result snippet. For example, computing device 214 receives SERP 248 from search engine 218 in response to a query submitted using query component 219. In addition, SERP 248 might include search-result snippet 259/254.

At step 614, the search-result snippet is presented that includes the interface. The interface includes a service-call instruction that, when executed, sends a service call to a website server requesting performance of an action by the website tool. For example, search-result snippet 254 is presented in SERP 248 on presentation component 246 and includes interface 220. In addition, interface 220 includes instructions 260 that, when executed, send a service call to website servers 216 to request performance of an action by website B tool 222. FIGS. 3A-3C are also illustrative. That is, FIG. 3A includes interface 320 that is included within a search-result snippet 359. Interface 320 also includes instructions that are embedded in selectable link 364, such that when the link 364 is selected, a service call (i.e., action request) is sent to servers hosting "www.doctoopdf.net" to request a document conversion.

At step 616, an input is received that is inputted into the interface. For example, an input may be received when input into input field 256/356b. Step 618 includes transmitting the service call and the input to the website server to request that the action be performed. For example, computing device 214 may transmit the service call and input (e.g., document to be converted, location, date, etc.) to website servers 216 to request that the action provided by website B tool 222 be performed. Computer device 214 may be prompted to transmit the service call and input by various triggers. For example, computer device 214 may be prompted by input of a selectable link (e.g., 364b) or may be automatically prompted upon receiving input in the input field(s).

Step 620 includes receiving an output generated by the website tool as a result of the action. At step 622 the output is presented in the interface, which is presented with the search-result snippet. For example, output may be received by computing device 214 from website servers 216 as a result of the action performed by website B tool 222. Output may be presented in the output field 258/358c of interfaces 220/320c, each of which is presented with a respective search-result snippet.

Figure 7:
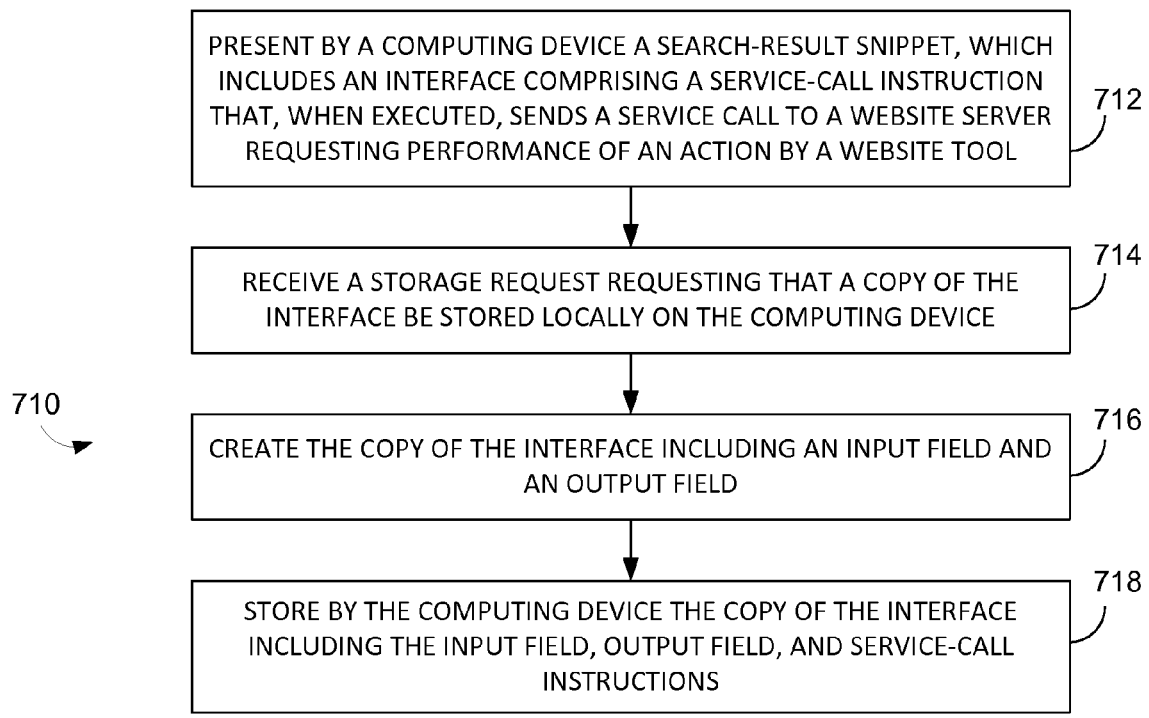

Referring now to FIG. 7, a flow diagram depicts a method 710 that may be carried out in accordance with an embodiment of the present invention. Steps of method 710 may be stored on computer-readable media as computer-executable instructions that, when executed by a computing device, perform a method of providing an interface that provides access to a website tool of a website. In describing method 710, reference may also be made to FIGS. 2 and 3A-3C.

Step 712 of method 710 includes presenting by the computing device a search-result snippet, which includes the interface comprising a service-call instruction. For example, search-result snippet 254/259 may be presented by presentation component 246 and includes interface 220. In addition, interface 220 includes instructions 260 that, when executed, send a service call to website servers 216 to request performance of an action by website B tool 222. FIGS. 3A-3c are also illustrative as described in other parts of this description.

Step 714 includes receiving a storage request requesting that a copy of the interface be stored locally on the computing device. At step 716, the copy of the interface is created that includes an input field and an output field. Further, step 718 includes storing by the computing device the copy of the interface including the input field, output field, and service-call instructions. For example, a drag-and-drop input or other cursor input (e.g., right mouse click) could be executed on interface 220/220b. As a result, a copy of interface 220/220b is created and is stored on the computing-device home screen. Although not explicitly depicted in FIG. 2, a copy of interface 220/220b may include a copy of input field 256, a copy of output field 258, and a copy of instructions 260.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer memory device storing computer-executable instructions that, when executed, perform a method of constructing a search-result snippet of a website, the method comprising:
   receiving by a search engine a search query;
   determining that the website is relevant to the search query, wherein the website provides a website tool that converts a document from a first format to a second format;
   constructing the search-result snippet to include an interface by including an input field in the search-result snippet programmed to receive the document in the first format and by including a service-call instruction that, when executed, sends a service call to a website server requesting that the website tool convert the document from the first format to the second format; and
   providing the search-result snippet, which includes the input field and the service call, together with a plurality of other search-result snippets describing other pages in response to the search query.

2. The computer-memory device of claim 1, wherein the method further comprises:
   receiving a website instruction from the website that indicates the website includes the website tool; and
   indexing the website instruction in a search-engine index.

3. The computer-memory device of claim 2, wherein receiving the website instruction includes crawling the website.

4. The computer-memory device of claim 2, wherein receiving the website instruction includes receiving a submission of the website instruction through a webmaster portal.

5. The computer-memory device of claim 1, wherein the input field is programmed to receive a drag-and-drop input of the document in the first format.

6. The computer-memory device of claim 1, wherein constructing the search-result snippet comprises including an output field in the search-result snippet that is is programmed to present an output of the document in the second format, which is received as a result of the service call while the search-result snippet is presented.

7. The computer-memory device of claim 1, wherein the interface includes a selectable link that is built to include the service-call instruction.

8. A system, which includes a processor and computer readable media, that constructs a search-result snippet of a website the system comprising:
   a search engine that receives a search query;
   a search-engine index that is leveraged by the search engine to determine that a plurality of websites are relevant to the search query, wherein the website is included among the plurality of websites, and wherein the search-engine index includes website instructions, which indicate that the website includes a website tool accessible at a landing page of the website;
   a snippet builder that constructs a plurality of search-result snippets,
      wherein each search-result snippet of the plurality of search-result snippets is tailored to summarize a respective website of the plurality of websites,
      wherein the snippet builder receives the website instructions and transforms the website instructions into an interface that provides access to the website tool and that is included in a search-result snippet summarizing the website, and
      wherein the interface includes a service-call instruction that provides access to the website tool without navigating to the landing page of the website; and
   a search-engine response page that provides the plurality of search-result snippets in response to the search query, wherein the search-result snippet of the website is included among the plurality of search-result snippets.

9. The system of claim 8 further comprising, a crawler that retrieves the website instructions from the website and that recognizes a website-tool format, which indicates that the website includes the website tool.

10. The system of claim 8 further comprising, a webmaster portal that receives a submission of the website instructions, wherein the website instructions are submitted to the webmaster portal in a website-tool format, which indicates that the website includes the website tool.

11. The system of claim 8, wherein the snippet builder constructs the interface of the search-result snippet to include an input field, which is programmed to receive a document to be sent to the website tool for conversion from a first format to a second format.

12. The system of claim 8, wherein the snippet builder constructs the interface of the search-result snippet to include an output field, which is programmed to present a document that is received from the website tool and that has been converted from a first format to a second format.

13. The system of claim 8, wherein the snippet builder constructs the interface of the search-result snippet to include a selectable link, which is programmed to send a request to the website tool when selected.

14. A method, which is executed using a processor and computer readable media, of constructing a search-result snippet of a website, the method comprising:
   receiving by a search engine a search query;
   determining that the website is relevant to the search query;
   determining that the website includes a website tool, which is accessible at a landing page of the website, by referencing a datastore that includes the website in a search-engine index;
   transforming, by the processor, the search-result snippet, which provides a summary that is tailored for the website, to include an interface, which comprises a service-call instruction that provides access to the website tool without navigating to the landing page of the website;
   constructing a search-engine response page to include the search-result snippet with the interface listed among a plurality of search-result snippets; and
   providing the search-engine response page in response to the search query.

15. The method of claim 14 further comprising, constructing the interface of the search-result snippet to include an input field, which is programmed to receive an input to be provided to the website tool.

16. The method of claim 14 further comprising, constructing the interface of the search-result snippet to include an output field, which is programmed to present an output received as a result of the website tool.

17. The method of claim 14 further comprising, constructing the interface to include a selectable link that is programmed to send a request to the website tool.

18. The method of claim 14 further comprising, constructing the interface including an input field and an output field to be an object, which is selectable from the search-engine response page to be copied and stored in another medium.

19. The method of claim 18, wherein the interface including the input field and the output field are collectively selectable from the search-engine response page by way of a drag-and-drop input.

\* \* \* \* \*